United States Patent [19]

Rojey et al.

[11] Patent Number: 5,252,229
[45] Date of Patent: Oct. 12, 1993

[54] METHOD AND A DEVICE FOR SEPARATING A CONTINUOUS FLUID PHASE FROM A DISPERSED PHASE

[75] Inventors: Alexandre Rojey, Garches; Jean-Claude Collin, Marsinval-Verneuil; Thierry Palermo, Paris, all of France

[73] Assignee: Institut Francais Du Petrole, Rueil-Malmaison, France

[21] Appl. No.: 717,001

[22] Filed: Jun. 18, 1991

[30] Foreign Application Priority Data

Jun. 18, 1990 [FR] France ................. 90 07622

[51] Int. Cl.$^5$ .............................. B01D 21/26
[52] U.S. Cl. .................... 210/787; 55/456; 210/512.1; 210/512.3; 210/788; 210/DIG. 5; 96/209; 95/261
[58] Field of Search ............ 210/787, 788, 512.1, 210/512.3, DIG. 5; 209/211, 144; 55/191, 203, 204, 456

[56] References Cited

U.S. PATENT DOCUMENTS

| | | | |
|---|---|---|---|
| 3,865,732 | 2/1975 | Terhune et al. ............ 210/DIG. 5 |
| 4,163,719 | 8/1979 | Macierewicz et al. ............ 210/787 |
| 4,478,718 | 10/1984 | Saget ............................ 210/512.3 |
| 4,481,020 | 11/1984 | Lee et al. ............... 55/203 |
| 4,666,476 | 5/1987 | Reeve et al. ............... 55/203 |
| 4,678,588 | 7/1987 | Shortt ................... 210/788 |
| 4,966,703 | 10/1990 | Kalnins et al. .......... 210/512.1 |
| 5,004,552 | 4/1991 | Al-Yazdi ............... 210/512.1 |
| 5,084,189 | 1/1992 | Richter ............... 210/787 |

Primary Examiner—Robert A. Dawson
Assistant Examiner—Sun U. Kim
Attorney, Agent, or Firm—Antonelli, Terry, Stout & Kraus

[57] ABSTRACT

A method and device for separating a continuous phase from at least one dispersed phase, with the phases having different densities. A mixture of the phases to be separated is supplied into a device including at least one cylindrical chamber vertically disposed and at least one static helically-shaped member is accommodated in the chamber. At least one face of the helically-shaped member is formed by a helicoidal surface. A maximum free path of a dispersed phase particle in a radial direction prior to colliding with the helically-shaped member is less than one quarter of a peripheral diameter of the member and, preferably, less than one tenth of an internal diameter of the chamber. The method and apparatus are capable of separating an aqueous phase from an organic phase such as, a petroleum fluid, with the mixture to be separated also possibly including a gaseous phase and a solid phase.

31 Claims, 3 Drawing Sheets

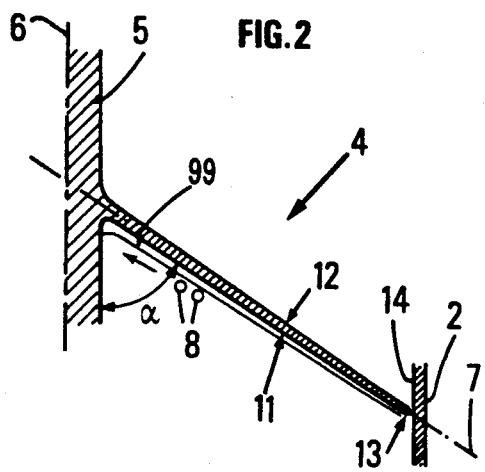
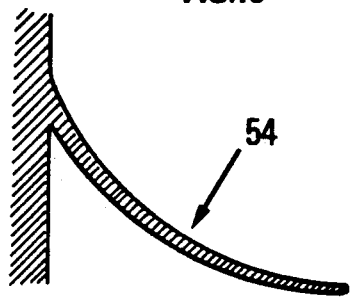
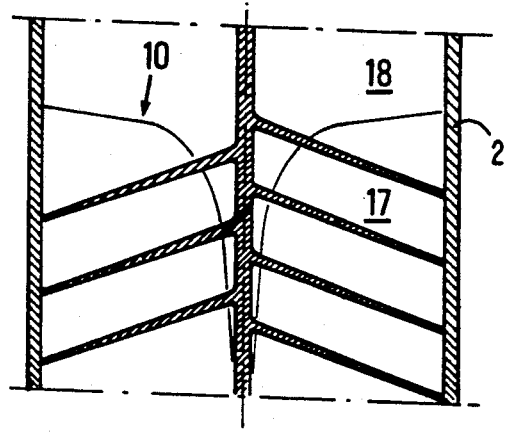
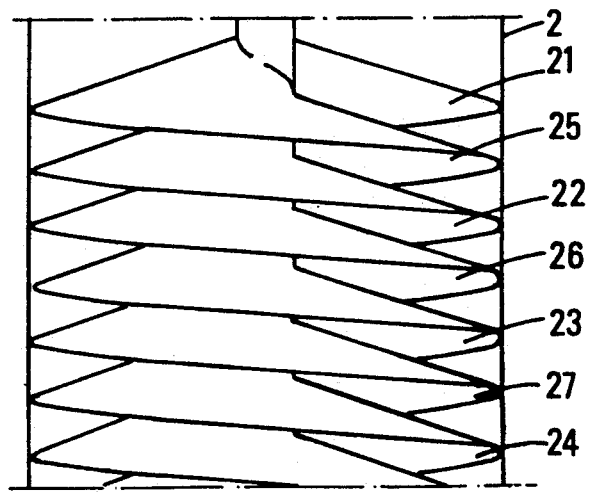
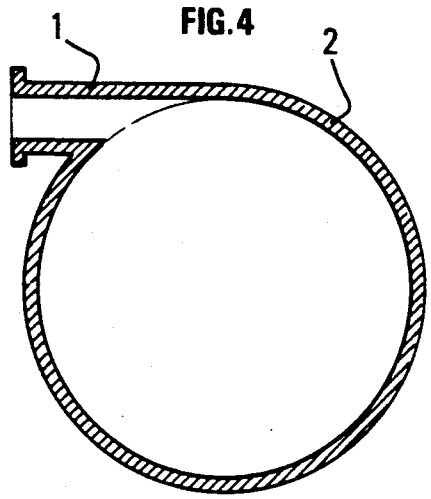
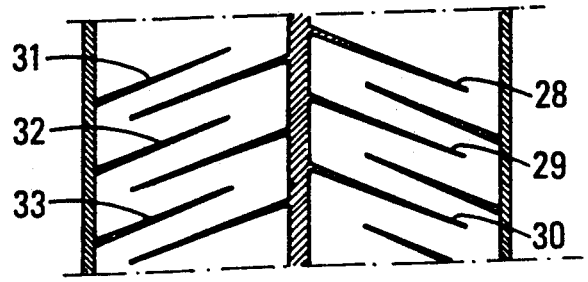

METHOD AND A DEVICE FOR SEPARATING A CONTINUOUS FLUID PHASE FROM A DISPERSED PHASE

FIELD OF THE INVENTION

The present invention concerns a method and a device for separating a continuous fluid phase from a dispersed fluid phase.

BACKGROUND OF THE INVENTION

The method for separating a continuous fluid phase from a dispersed fluid is extremely important for industrial applications.

By way of example, this method may involve separating an aqueous phase from an organic phase, such as a crude petroleum phase.

It becomes increasingly important to have an effective method for separating two heterogenous phases of this type. In fact, the concern for protecting the environment makes it necessary to reduce the hydrocarbon content of aqueous waste having extremely low values.

Separation installations, such as those equipping offshore crude petroleum production platforms, also need to be compact and light to satisfy economic constraints and allow for production in difficult zones. This is even more valid when these separation installations are installed between two water levels or at the water bottom, especially in crude petroleum and gas applications.

Finally, it is essential to use simple reliable methods and devices requiring minimum maintenance and being capable of easy automation.

There are a large number of techniques for embodying such a separation.

The simplest technique consists of sending the mixture of the phases to be separated into a chamber whose volume is calculated so as to enable the mixture to remain there for a sufficient time allowing all the drops or bubbles forming the dispersed phase to have sufficient time to collect together and coalesce at the separation interface between the two phases.

This technique, which is currently widely used, results in requiring the use of installations taking up a large amount of space.

One improvement of this technique consists of having, on an inside of the separation chamber, parallel plates on which the dispersed phase coalesces before rising to the interface for separating the two phases.

Another technique consists of placing a lining which improves coalescence of the dispersed phase.

Another technique, known as flotation, used when the dispersed phase is a liquid phase, consists of making the coalescence dispersed phase rise by sending a fine gas dispersion, the droplets to be separated being fixed on the surface of the bubbles.

The phase separation technique may be significantly improved by resorting to making use of the effect of centrifugal separation so as to increase or replace the effect of gravity. This may be carried out in a centrifugal machine driven by a motor, which makes it possible to embody an extremely compact installation. However, this solution has the drawback of being too complex and less reliable owing to the presence of the motor.

The centrifugal effect may also be obtained in a fully static device. The use of cyclones and especially hydrocyclones based on such a principle is currently being developed due to the advantages possible with such devices allowing for good separation effectiveness whilst being those of the static type.

The inventors have discovered that it is possible to embody a static type separation by a method more effective than known methods of the prior art by coalescing the fluid phase dispersed on a surface whose geometry makes it possible to collect the dispersed phase into one zone and the continuous phase into another zone by submitting both the two phases to be separated to a rotating movement obtained by the flow of the mixture to be separated along the coalescence promoting surface.

More specifically, the method of the invention consists of sending the mixture to be separated into a preferably vertical chamber in which an internal helicoidal surface is disposed whose generating line slants with respect to the perpendicular plane of the chamber axis, thus ensuring the mixture to be separated is rotary-driven and collecting the dispersed particles of the phase on the internal helicoidal surface disposed in the chamber.

SUMMARY OF THE INVENTION

The present invention concerns a method for separating a continuous phase from at least one dispersed phase with each phase having a different density. This method is characterized in that the mixture of the phases and to be separated is supplied into a device formed by at least one approximately cylindrically-shaped chamber and at least one hellically-shaped internal piece whose at least one face having one helicoidal surface, the piece delimiting at least one helicoidal passage. The internal piece is adapted in such a way so that the maximum path of one particle of the dispersed phase along the radial direction before colliding is less than one quarter of the peripheral diameter of the internal piece.

The helicoidal surface has, as a projection on a phase perpendicular to the axis of the chamber, a surface equal to at·least half the total internal right section of the cylindrical chamber.

In addition, the method of the invention is characterized in that the flow of the mixture of the phases and along the passage provokes a rotation movement around the axis of the chamber, resulting in the lighter phase moving towards the axis and the heavier phase towards the periphery of the chamber during which the dispersed phase coalesces, at least partially on the walls of the passage, and then forms a continuous phase separated from the continuous phase by an interface, the lighter and heavier phases being bled on both sides of the interface.

The invention also concerns a device for separating a continuous phase from at least one dispersed phase, each phase having a different density, and comprising a cylindrical or substantially cylindrical chamber. This device is characterized in that it comprises at least one helicoidal internal piece with at least one face having a helicoidal surface and which partly delimits a helicoidal passage.

The internal piece is adapted so that the maximum distance of the path of a particle of the dispersed phase along the radial direction before colliding is less than one quarter of the peripheral diameter of the internal piece. The helicoidal surface, as a projection on a plane perpendicular to the axis of the chamber, has at least one surface equal to half the total right section of the cylindrical chamber. The flowing of the mixture of the phases and along the passage provokes a rotary movement around the axis of the chamber resulting in the lighter phase moving towards the axis and the heavier phase towards the periphery of the chamber, during which the dispersed phase coalesces, at least partly on the walls of the passage, and then forms a continuous phase separated from the continuous phase by an interface, with the lighter and heavier phases being bled on both sides of said interface.

The piece may be static in the chamber or may be rotatable freely around itself.

The device may be deprived of external means for making the piece rotate around itself.

The walls of the passage could be partly or fully formed by a material preferably wettable by the dispersed phase.

The axis of the cylindrical chamber could be vertical.

The device may comprise means for tangentially introducing said mixture into the chamber.

The passage could comprise at least one helicoidal wall described by a generating line forming, with the axis of the chamber, on at least one part of its length, an angle of less than 60 degrees.

The slope formed by the the generating line of the helicoidal surface with respect to the axis of the chamber could decrease when the distance with respect to the axis decreases.

The angle formed by the tangent at any point of the curve described by the extremity of the generating line of the helicoidal surface with respect to the horizontal surface may be less than 60 degrees.

The mixture of the phases to be separated may be sent into a device comprising a plurality of helicoidal surfaces derived from one another by a uniform translation and which form the helicoidal surface.

The distance between two surface elements belonging to a given massage and situated on a given vertical line may be less than one tenth of the internal diameter of the cylindrical chamber.

The central axis of the helicoidal static piece may be recessed and provided with perforations along its periphery so as to make it possible to collect and remove the dispersed phase through the central axis.

The maximum distance of the path of a dispersed phase particle along the radial direction before colliding may be less than one tenth of the internal diameter of the chamber.

The passage may comprise a lining wettable by the dispersed phase, and the lining may be formed of a fabric.

The passage may comprise a lining solely constituted by wires wettable by the dispersed phase, with the axis of these wires being along the same direction as the circulation of the continuous phase.

The perforated waves, including the nappes, may be placed parallel to the central axis of the chamber and disposed on the upper surface of the passage and expanded in the circulation direction of the continuous phase.

One wall of the passage may be undulated or provided with spherical or conical cylindrical picots.

One wall of the passage may be lined with a standard macroporous nonwoven material wettable by the dispersed phase.

The continuous phase may be a liquid phase and the dispersed phase may at least include one liquid phase.

The dispersed phase may be an organic phase and the continuous phase an aqueous phase.

A thinly dispersed gaseous phase could be introduced at the bottom of the chamber so as to more effectively separate the dispersed phase.

The dispersed phase may be a gaseous phase and the continuous phase a liquid phase.

The mixture of the phases to be separated may be introduced at one upper extremity of the chamber below the interface formed between the continuous phase and the continuous phase formed by the dispersed phase at the entrance after coalescence, with the continuous phase being removed to a point situated in the lower part of the device at the periphery of the dispersed chamber and the phase being removed to a point situated at the upper part of the device at the periphery of the chamber above the interface.

The dispersed phase may be an aqueous phase and the continuous phase may be organic phase.

The mixture of phases to be separated may be introduced at one upper extremity of the chamber, with the dispersed phase at the entrance being removed to a point situated in the lower phase of the chamber below the interface, and with the continuous phase being removed to a point situated in the lower part of the chamber above the interface and close to the axis of the chamber.

An electric potential difference may be created between the lower and upper walls of said passage.

The dispersed phase may include a solid phase.

The mixture to be separated, may comprise a gaseous phase, a liquid organic phase, a liquid aqueous phase and solid particles, with the gaseous phase being bled at one upper extremity of the wall, the solid particles at a lower extremity, and the organic and aqueous phase at intermediate points.

The method and device of the invention may be advantageously applied for separating the mixture of crude petroleum and/or gaseous fluids, especially in an aquatic medium, on the surface between two water levels or at the water bottom.

BRIEF DESCRIPTION OF THE DRAWINGS

The invention shall be more readily understood and its advantages more clearly defined from the following description and the attached drawings wherein:

FIGS. 2 and 3 show a vertical section of a portion of the device according to the invention, FIG. 4 shows a cross section of the chamber of the device, FIGS. 5 to 12 and 16 show a partial cross section of the variants of the device of the invention, and FIGS. 13 and 15 diagramatically show one section of the particular dispositions or uses of the device of the invention.

DETAILED DESCRIPTION OF THE PREFERRED EMBODIMENTS

The invention is described in more detail with reference to the arrangement of FIG. 1 and which represents a particular embodiment. This embodiment is applied for separating a mixture wherein the dispersed phase is the lighter phase and the continuous phase is the heavier phase. The device shown on FIG. 1 is more particularly designed for separating a dispersed liquid phase from a continuous liquid phase and corresponds, for example, to separating a dispersed organic phase from a continuous aqueous phase.

The mixture of the continuous aqueous phase and dispersed organic phase is introduced via the input pipe 1 into the cylindrical vertical chamber 2. FIG. 1 shows a section of this chamber along a vertical median plane.

Figure 1:
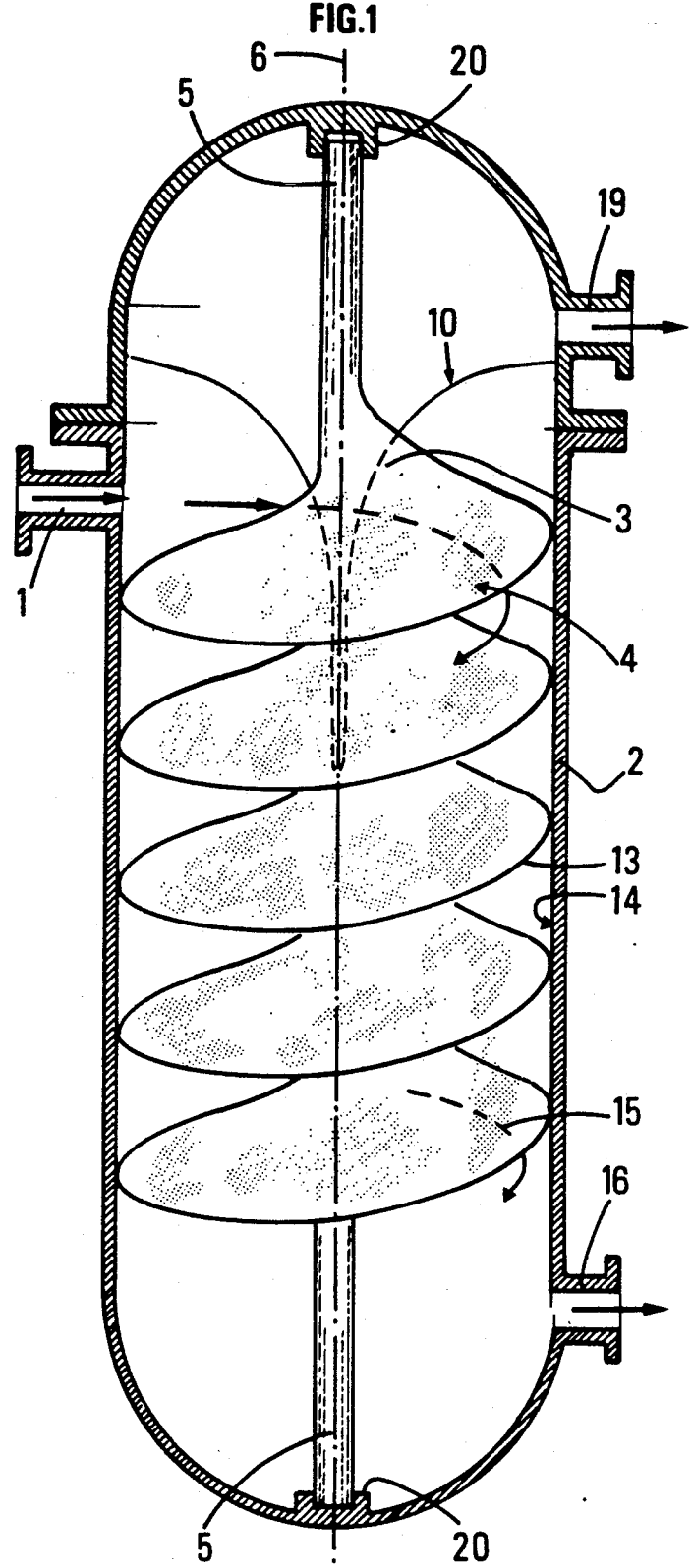
FIG. 1 shows a particular embodiment of the device of present invention.

A helicoidal-shaped member 3, shown in perspective in FIG. 1 and whose surface 4 is preferably wettable by the dispersed phase is disposed inside the vertical chamber.

The reference 5 denotes the central core or boss of the helix 3 and the reference 6 the axis of the helix.

One essential characteristic of the geometry of the member 3 is that the generating line 7 (FIG. 2) of the helicoidal surface 4 is relatively slanted with respect to the vertical direction which coincides with the direction of the axis 6, as shown in FIG. 2. Thus, the light dispersed phase 8 coalesces on the lower surface 11 of said member 3 and climbs up (see reference 9) along said helicoidal member towards the axis of the chamber which is merged with the axis of the helix and then around this axis towards the interface 10 between the two phases situated at the upper portion of the chamber 2.

When the dispersed phase is the heaviest phase this phase coalesces on the upper surface 12 (FIG. 2) of the member 3 and flows along said helicoidal member 3 and, more particularly, at the periphery of the helicoidal member. In this example, the surfaces of the member 3 are preferably wettable by the heavy phase.

FIG. 1 shows the helicoidal member 3 occupying the entire section of the vertical chamber 2, its edge 13 roughly joined with or in contact with the internal surface 14 of the chamber 2.

The mixture of the two phases is guided in rotation due to its flow along the helicoidal surface. The movement of the descending portion of the mixture is shown in FIG. 1 by the arrow. Thus, a centrifugal effect is obtained which is added to the effect of gravity so as to move the lighter phase towards the axis of the chamber and the heavier phase towards the periphery of the chamber.

In the example shown in FIG. 1, the aqueous phase, freed of drops of the dispersed phase, is bled in the lower portion of the chamber 2 and removed via the pipe 16. The organic phase rises around the axis, thus forming a continuous phase whose interface 10 formed by a wetted film, along with the aqueous phase shown in FIG. 3, forms an increasingly flared surface ressembling, in its upper portion a horizontal surface below which the continuous phase 17 is the aqueous phase and above which the continuous phase 18 is the organic phase.

The separated organic phase is removed via the pipe 19. Thus, as shown in FIG. 1, the chamber comprises two evacuation pipes 16 and 19, with the first pipe 16 removing the heaviest continuous phase, in this case the aqueous phase, and the other pipe 19 removing the lightest continuous phase, namely the organic phase. The first orifice is situated at the lower portion of the chamber and the other at the upper portion. The pipe 1 for introducing the mixture is placed at a level situated between the two pipes 19 and 16.

In a preferred embodiment, the surface of the helix on which coalescence is effected is formed by a material able to be wetted by the dispersed phase, with this surface being formed by the upper and lower face of the helical member 3. This favors the formation of a film 99 of one portion of the dispersed phase which has coalesced.

One portion of the dispersed phase still not coalesced shall coalesce on this film. Thus, if, for example, the continuous phase is an aqueous phase and the dispersed phase an organic phase, this surface may either be formed of a polymer material or coated with said material.

The helicoidal member 3 is preferably removable so as to be able, if required, to clean it outside the chamber 2.

The helicoidal member 3 could be rotary-mounted fixed in the chamber 2 or able to freely rotate around the axis 6. Depending of either of these variants, the boss 5 shall or shall not be rotary-immobilized on the bearings 20.

In the case where the helicoidal member is freely rotating and in the absence of any external motor mean its movement shall result from that of the phases circulating around it.

This embodiment has the following advantageous characterstics:

absence of any motor responding to a need for simplicity for this type of device;

minimization of losses via friction since the helicoidal member 3 is driven in the direction of the phase which generated the largest number of losses by rubbing on the walls of the helix if the latter were fixed, reduction of the shearing effect of the phase which coalesced; thus avoiding its redispersion, action of the centrifugal effect added to the effect of gravity on the surface of the helicoidal member 3, faciliating drainage of the coalesced film.

The mixture to be separated is preferably introduced tangentially into the chamber 2 so as to favor the movement of rotation phases to be separated along the helicoidal member 3, as shown in FIG. 4 showing a section of the entry of the pipe 1 into the chamber 2, with the helicoidal member 3 not being shown in such figure for the same of clarity.

The speed reached by the continuous phase is in this case highest at the periphery of the chamber where the average speed may be between 1 and 10 m/s which, for a diameter of 0.1 m, results in a centrifugal acceleration of between 20 and 2000 m2/s.

Generally speaking, centrifugal acceleration is much higher than gravity at the periphery of the chamber and the drops of the dispersed phase follow a roughly horizontal trajectory.

The generating line of the helicoidal surface 4 needs to be sufficiently slanted with respect to horizontal so that the maximum distance of the path of a drop along the radial direction prior to colliding is reduced.

If, for example, the angle of the generating line of the helicoidal surface 4 with respect to vertical is 45 degrees, this maximum distance of the path along the radial direction prior to collision is equal to the distance between two successive helicoidal surface portions. This angle is preferably less than 60 degrees on at least one portion of the generating line.

In a preferred embodiment, according to the invention, the maximum distance of the path of a drop of the dispersed phase along the radial direction prior to colliding should be reduced. Good results are expected when this distance is at least one quarter less than the peripheral diameter of the internal member 3 and preferably less than one tenth of the internal diameter of the chamber 2.

In summary, the method for separating one continuous phase from at least one dispersed phase, both phases having different densities, is characterized in that the mixture of the phases and to be separated is sent into a device formed by at least one cylindrical-shaped chamber 2 and at least one internal helicoidal-shaped member 3, at least one of whose faces having a helicoidal surface, with the member 3 partly delimiting a helicoidal passage and being adapted so that the maximum distance of the path of a particle of the dispersed phase along radial direction prior to collision is less than one quarter of the peripheral diameter of the internal member 3. The helicoidal shaped member has, as a projection on a plane perpendicular to the axis of the chamber, an area at least equal to half the overall internal cross section of the cylindrical chamber 2 and the flowing of the mixture of the phases and along said passage provokes a movement of rotation around the axis of the chamber 2 resulting in a movement of the lightest phase towards the axis and the heaviest phase towards the periphery of the chamber during which the dispersed phase coalesces, at least partly, on the wall of the passage, and then forms a continuous phase separated from the continuous phase by an interface with the light and heavy phases being bled on both sides of said interface.

The successive spirals forming the piece 3 are, preferably, relatively close together so as to favor coalescence of the dispersed phase. Thus, it has been found that the angle, formed by the tangent at any point of the spiral described by the extremity of the helicoidal surface on which the dispersed phase coalesces, is preferably less than 60 degrees.

So as to increase the surface on which the dispersed phase coalesces, it is possible to have a plurality of helicoidal surfaces derived from one another via a helicoidal translation, with all these surfaces forming the helicoidal surface 4.

For example, in FIG. 5, the spirals 21, 22, 23 and 24 belong to a first helicoidal surface and the spirals 25, 26 and 27 to a second helicoidal surface derived from the first by translation. The helicoidal surfaces forming the surface 4 may be integral with a central axis i.e. FIG. 1, or integral with the chamber. It is also possible to have a first helicoidal surface integral with the axis and one second helicoidal surface integral with the chamber, as shown in FIG. 6.

In FIG. 6, the spirals 28, 29 and 30 belong to a first helicoidal surface integral with the axis of the central boss 5 and the spirals 31, 32 and 33 of a second helicoidal surface integral with the chamber.

Figure 7:
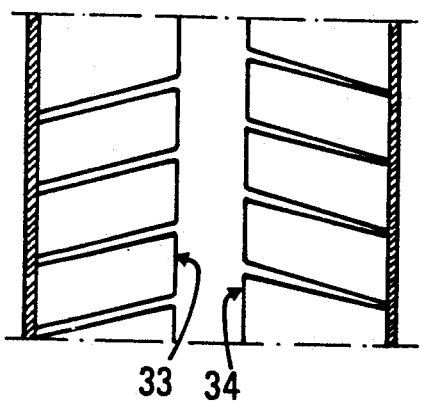

In one of the embodiments of the method of the invention, when the dispersed phase is the lightest and the continuous phase the heaviest, the continuous phase is moved towards the periphery of the device and the dispersed phase coalesces on the surfaces of the spirals, thus forming droplets which collect together on the periphery of the central axis, thus forming a film which is removed by the perforations 33 and 34 made below the connection of the spires on the central axis which is recessed so as to allow for removal of said film mainly made up of compounds forming the dispersed phase outside the device. Such a disposition is shown in FIG. 7.

So as to favor coalescence of the dispersed phase, it is possible to have, between the spirals of the helicoidal piece 3, a lining able to be wetted by the dispersed phase. This lining may be formed, for example, of polymer fibers if the dispersed phase is an organic phase.

Figure 8:
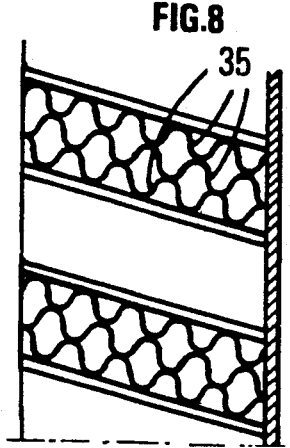

These fibers may appear in the form of a fabric, preferably disposed parallel to the spirals of the helicoidal member 3 with one or several thicknesses in the form of superimposed waves as shown in FIG. 8.

The use of a lining facilitates coalescence of the dispersed phase by reducing the maximum distance of the path of a drop of the dispersed phase before encountering the internal elements favoring coalescence and makes it possible to obtain a maximum distance of the path of less than one tenth of the internal diameter of the chamber 2 without having to observe any particular condition concerning the inclination of the spirals of the helicoidal surface 4.

Figure 9:
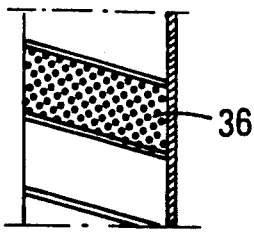

So as to seduce any charge losses linked to the presence of the lining, it is possible in one preferred embodiment of the device that this lining be solely constituted by wires 36 able to be wetted by the dispersed phase and disposed between the spirals in the direction of circulation of the fluid so as to reduce the charge loss and avoid the shearing effects of the phases constituting the fluid. This arrangement is shown in FIG. 9.

Figure 10:
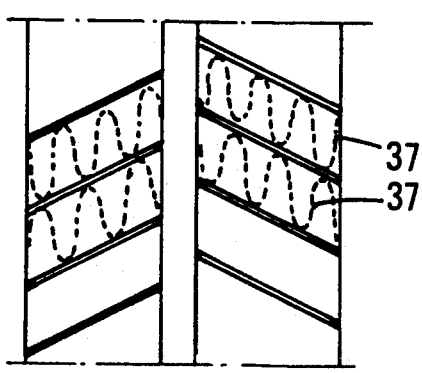

With the aim of increasing coalescence of the dispersed phase, it is also possible to have between the spirals perforated wave-shaped baffle 37 placed parallel to the central axis and disposed at the upper face of the spirals and expanded along the direction of rotation of the helicoidal-shaped static piece H as shown in FIG. 10. This disposition makes it possible to increase the contact surface without impeding flowing of the liquid vein circulating between the spirals. These waves are made of a material able to be wetted by the dispersed phase. The perforations of the waves allow for circulation of drops which have coalesced and collect together so as to form a continuous film along the central axis of the spiral and which is evacuated in the upper portion of the device.

Figure 11:
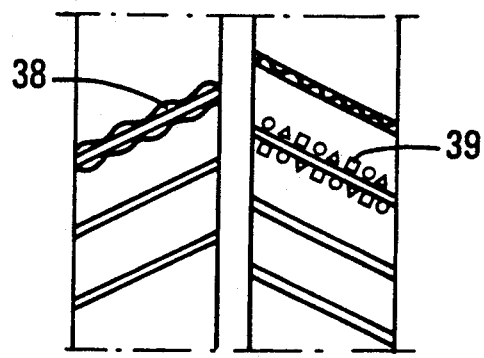

So as to favor coalescence, it is also possible to increase the contact surface where this coalescence occurs by creating at the upper and lower surfaces of the spirals a relief composed, for example, of undulations 38 or spherical or conical conical cylindrical picots 39 so as to increase the impact probability of the dispersed phase without creating shearing forces. These picots 39 may be made of the same material as that of the spirals and are rendered integral with the surface of the spirals by welding, moulding or drawing according to the material comprising the helicoidal piece 3. This version is shown in FIG. 11.

Figure 12:
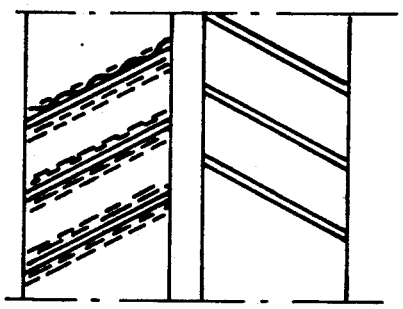

The method of the invention is applicable to different separation types. In the case of separation where the dispersed phase is mainly made up of microdroplets or, for example, in the case where dispersed phase/continuous phase separation needs to satisfy strict norms, it is possible to embody this separation by covering the surface of the spirals with a lining made of macro porous fibers or any non-woven material able to be wetted by the dispersed phase. This lining may be rendered integral with the surface of the spirals by gluing or any mechanical fixing device familiar to technicians in this field. This lining makes it possible to isolate the phase which has coalesced from the fluid circulating between the spirals so as to avoid the coalesced phase or the droplets comprising it being mechanically driven by the continuous phase. This device is shown in FIG. 12.

The method of the invention is applicable to different case of separation.

As in the example of FIG. 1, the dispersed phase (II) may be lighter than the continuous phase. For example, the dispersed phase may be an organic phase and the continuous phase an aqueous phase.

The method is also applied to the deoiling of the production water separated from the crude petroleum on a production field.

The dispersed phase may also include a gaseous phase, the continuous phase being a liquid phase.

In this case, the gaseous phase is moved towards the central portion of the device and then collects together to a gas/liquid interface so as to form a continuous phase which is drawn off at a point situated in the upper portion of the device with the liquid phase being drawn off at a point situated in the lower portion of the device.

Figure 13:
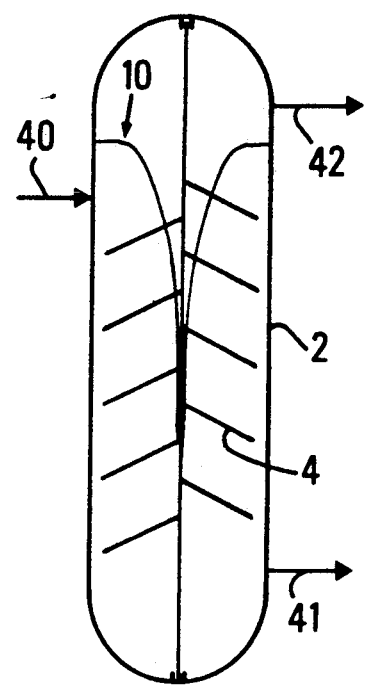

When the dispersed phase at the entrance is the lightest phase, the mixture of the phases to be separated is introduced at an upper extremity of the device below the interface between the continuous phase and the continuous phase formed by the dispersed phase after tangentially coalescence in the chamber 2. Such a disposition is shown on the diagram on FIG. 13.

The mixture of the phases to be separated is introduced by the pipe 40 below the interface 20 between the two phases to be separated. The helicoidal surface 4 is shown as a section. The continuous phase is removed to the periphery of the chamber 2 by the pipe 41 and the dispersed phase at the entrance is removed by the pipe 42 to the periphery of the chamber 2.

So as to favor separation of the dispersed phase when this dispersed phase is the lightest, it is possible to inject at the bottom of the chamber 2 a finely dispersed gaseous phase. For example, so as for the deoiling of an aqueous phase, it is possible to send fine air bubbles onto the surface, microdrops of the organic phase able to be fixed from these bubbles.

The dispersed phase may also be a phase heavier than the continuous phase.

For example, the dispersed phase may be an aqueous phase and the continuous phase an organic phase.

In this case, as the mixture to be separated is introduced into the upper portion of the device, the aqueous phase is driven towards the periphery of the device and then collects together at a liquid/liquid interface 10 so as to form a continuous phase which is drawn off below the interface 10 at a point situated in the lower portion of the device but above the interface 10 at a point close to the axis of the device. Such an arrangement is shown in FIG. 14.

Figure 14:
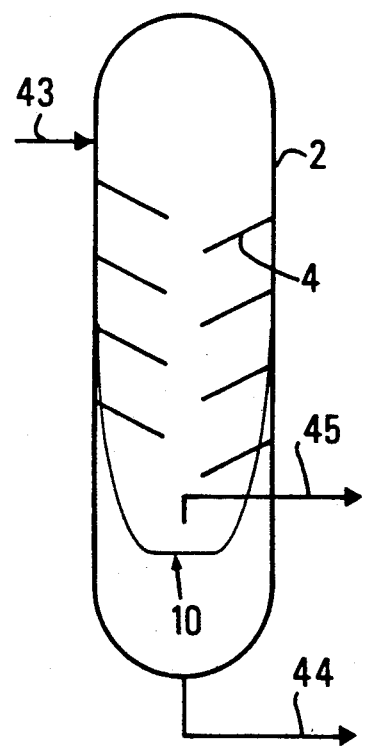

Such disposition is shown by the diagram on FIG. 14.

The mixture of the phases to be separated is introduced by the pipe 43 opening tangentially into the chamber 2, the surface 4 shown as a section being in this case integral with the chamber 2. The dispersed phase is removed by the pipe 44 to a point situated in the lower portion of the chamber 2 below the interface 10 and the continuous phase by the pipe 45 which bleeds the continuous phase at a point close to the axis of the device situated above the interface 10.

The dispersed phase may also include a solid phase which, in this case, is removed at the bottom of the device.

The method is more particularly applicable to the desalination of crude petroleum, the aqueous phase charged with salts being in this case the dispersed phase and the crude petroleum the continuous phase.

As the aqueous phase drops are charged at their surface, it is possible in this case to favor seperation between the phases and coalescence on the helicoidal surface 4 by applying a potential difference between two successive spirals. Such a method may be applied each time the drops or particles forming the dispersed phase are charged at their surface.

The method may also be applied to separate more than two phases in the same device.

The method may be applied, for example, to separate all the phases coming out of a crude petroleum production well, in other words, the associated gas, the petrol, water and possibly any dispersed solid particles.

Figure 15:
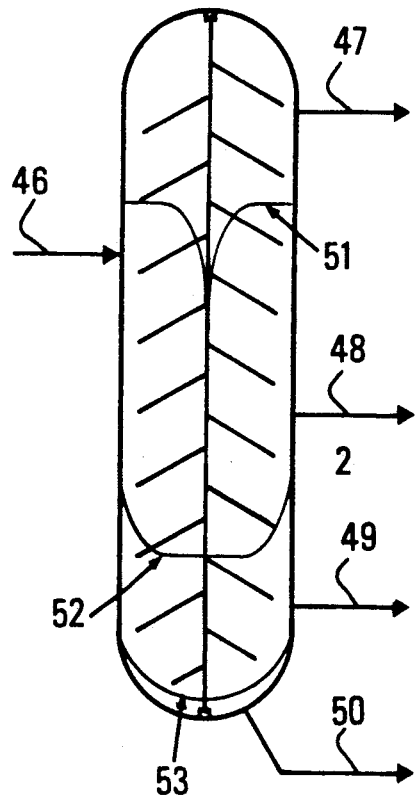

This sort of arrangement is shown in FIG. 15.

The mixture of the phases to be separated coming out of the production well is supplied by the pipe 46 into the chamber 2. The associated gas collects together in the upper portion of the device and is removed by the pipe 47. Along with the crude petroleum, it forms an interface 51. The mixture to be separated is sent tangentially into the chamber below the interface 51.

The aqueous phase and the solid phase particles collect in the lower portion of the device. Along with the crude petroleum, the aqueous phase forms an interface 52, the crude petroleum being removed by the pipe 48 and the aqueous phase by the pipe 49.

The solid phase is concentrated at the bottom of the device, with the surface 53 designating the limit of the phase rich in solid particles. This phase rich in solid particles is removed by the pipe 50.

FIG. 16 shows the case of a a helicoidal surface whose section, through one vertical plane, represents a curvilinear shape 54 not corresponding to a rightside section.

What is claimed is:

1. Method for separating a mixture comprising a continuous phase and at least one dispersed phase, both phases having different densities, with the dispersed phase being a light phase and the continuous phase being a heavy phase, wherein the mixture of the phases is supplied to a device formed by at least one substantially cylindrical-shaped chamber, said chamber having an axis, an internal cross section, and at least one internal helicoidal-shaped member having a peripheral diameter and at least one face provided with a helicoidal surface, said at least one helicoidal-shaped member defining, at least partly, a helicoidal passage, said at least one internal helicoidal-shaped member being arranged within the chamber so that a maximum distance of a path of a particle of the dispersed phase along a radial direction in a direction away from the axis prior to collision with the at least one internal helicoidal-shaped member is less than one quarter of a peripheral diameter of the at least one internal helicoidal-shaped member, said helicoidal surface having, as a projection on a plane perpendicular to the axis of said chamber, a surface equal to at least one-half an overall internal crosssection of the chamber, and wherein a flowing of the mixture of phases along said passage induces a movement of rotation of the mixture around the axis of the chamber resulting in a displacement of the lightest phase toward the axis of the chamber and the heaviest phase towards a periphery of the chamber during which the dispersed phase at least partly coalesces on walls of said passage, and then forms a continuous phase separated from the continuous phase by an interface, and wherein duct means are provided at a lower portion of the chamber for removing the heavy phase and duct means are provided at the upper portion of the chamber for removing the light phase.

2. Method according to claim 1, wherein and electric potential difference is created between a lower and an upper wall of said passage.

3. Method according to claim 1, wherein the mixture to be separated includes a gaseous phase, a liquid organic phase, a liquid aqueous phase and solid particles, the gaseous phase being bled at one upper extremity of the chamber, the solid particles at one lower extremity, and the organic phase and the aqueous phase are bled at intermediate points.

4. Method according to claim 1 for separating a mixture of crude petroleum fluids and/or gases, especially in an aquatic medium, on the helicoidal surface, between two water levels or at the water bottom.

5. Method according to claim 1, wherein the dispersed phase is an aqueous phase and the continuous phase an organic phase.

6. Method according to claim 5, wherein the mixture of the phases to be separated is introduced at one upper extremity of the chamber, the dispersed phase at an entrance is removed at a point situated in a lower portion of the chamber below the interface, the continuous phase being removed at a point situated in the lower portion of the chamber above the interface and near to the axis of the chamber.

7. Method according to claim 1, wherein the dispersed phase is an organic phase and the continuous phase is an aqueous phase.

8. Method according to claim 1, wherein a finely dispersed gaseous phase is introduced at a bottom of the chamber so as to cause separation of the dispersed phase.

9. Method according to claim 1, wherein the dispersed phase is a gaseous phase and the continuous phase a liquid phase.

10. Method according to one of claim 7, 8 or 9, wherein the mixture of the phases to be separated is introduced at one extremity of the chamber below the interface formed between the continuous phase and the continuous phase formed by the dispersed phase at an entrance after coalescence, the continuous phase being removed to a point disposed in a lower portion of the device at a periphery of the chamber, and the continuous phase formed by the dispersed phase at the entrance after coalescence is removed at a point disposed in the upper extremities of the device at the periphery of the chamber above the interface.

11. Device for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of a path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the chamber, and wherein a flowing of the mixture along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, and wherein wherein duct means are provided at a lower portion of the chamber for removing the heavy phase and duct means are provided at the upper portion of the chamber for removing the lift phase.

12. Device according to claim 11, wherein the walls of said passage are one of partly or fully formed by a material capable of being wetted by the dispersed phase.

13. Device according to claim 11, wherein the axis of the cylindrical chamber is vertical.

14. Device according to claim 11, further comprising means for tangentially introducing said mixture into the chamber.

15. Device according to claim 11, wherein the mixture of phases to be separated is supplied to a device comprising a plurality of helicoidal surfaces derived from one another by a uniform translation and which form the helical surface.

16. Device according to claim 11, wherein the maximum distance of the path of a particle of the dispersed phase along a radial direction prior to collision with the member is less than one-tenth of an internal diameter of the chamber.

17. Device according to claim 11, wherein at least one wall of the passage is covered with a nonwoven macro-porous material adapted to be wetted by the dispersed phase.

18. Device according to claim 11, wherein said passage comprises a lining adapted to be wetted by the dispersed phase.

19. Device according to claim 11, wherein said member is static in said chamber.

20. Device according to claim 19, wherein a central axis of the internal helicoidal-shaped member is recessed and provided with perforations on a periphery thereof so as to allow for collection and removal of the dispersed phase through said central axis.

21. Device according to claim 11, wherein said passage comprises at least one helicoidal-shaped wall described by a generating line forming, along with the axis of the chamber on at least one part of a length thereof an angle of less than 60°.

22. Device according to claim 21, wherein a slope formed with respect to the axis of the chamber by the helicoidal surface decreases when the distance with respect to the axis decreases.

23. Device according to claim 21, wherein the angle, formed by a tangent at any point of a curve described by an extremity of the generating line of the helicoidal surface with respect to a horizontal, is less than 60°.

24. Device for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phases along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, and wherein said at least one helicoidal-shaped member is freely rotatable.

25. Device according to claim 24, wherein no external means are provided for rotating said at least one helicoidal-shaped member.

26. Device, for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phases along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, and wherein a distance between two surface elements of a given passage and disposed on a given vertical line is less than one-tenth of an internal diameter of the cylindrical chamber.

27. Device for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phase along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, said passage comprises a lining adapted to be wetted by the dispersed phase, and wherein the lining is formed by a fabric.

28. Device, for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phases along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, wherein said passage comprises a lining including wires adapted to be wetted by the dispersed phase, an axis of said wires is in the same direction as a circulation of the continuous phase.

29. Device, for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phases along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, and wherein perforated waves including nappes, are placed parallel to the central axis of the chamber and are disposed on an upper surface of the passage and extend in a circulation direction of the continuous phase.

30. Device for separating a mixture comprising at least a continuous phase and at least one dispersed phase, said continuous and dispersed phases having different densities, with the dispersed phase being a light phase and the continuous phase being a heavy phase, the device comprising a cylindrical chamber, at least one internal helicoidal-shaped member arranged in the cylindrical chamber, said at least one internal helicoidal-shaped member having at least one face forming a helicoidal surface, said at least one helicoidal-shaped member at least partly defining a helicoidal passage and being arranged so that a maximum distance of the path of a particle of the dispersed phase in a radial direction prior to collision with said at least one helicoidal-shaped member is less than one quarter of a peripheral diameter of the at least one helicoidal-shaped member, said helicoidal surface having, as a projection on a plane perpendicular to a central axis of said chamber, a surface equal to at least one-half an overall internal cross-section of the cylindrical chamber, wherein a flowing of the mixture of the phases along said passage induces a movement of rotation of the mixture around the axis of the chamber resulting in a displacement of the lightest phase toward the axis of the chamber and the heaviest phase toward a periphery of the chamber during which the dispersed phase at least partly coalesces on walls of said passage, and then forms a continuous phase separated from the continuous phase by an interface, the light phase and the heavy phase are bled on both sides of said interface, and wherein one of the walls of the passage is one of undulated or provided with at least one of spherical or conical cylindrical-shaped picots.

31. Method implementing the device according to any one of claims 11 to 17, wherein the continuous phase is a liquid phase and the dispersed phase includes at least one liquid phase.

* * * * *